(12) United States Patent  
Garcia-Martin

(10) Patent No.: US 7,529,213 B2  
(45) Date of Patent: May 5, 2009

(54) METHOD AND ARRANGEMENT FOR SIGNALLING IN A WIRELESS IP MULTIMEDIA NETWORK AND A WIRELESS IP MULTIMEDIA NETWORK TERMINAL DEVICE

(75) Inventor: Miguel-Angel Garcia-Martin, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1150 days.

(21) Appl. No.: 10/291,762

(22) Filed: Nov. 12, 2002

(65) Prior Publication Data

US 2003/0108020 A1 Jun. 12, 2003

(30) Foreign Application Priority Data

Nov. 12, 2001 (FI) .................................. 20012191

(51) Int. Cl.
*H04Q 7/24* (2006.01)
(52) U.S. Cl. .................. 370/338; 370/328; 370/312; 370/313; 455/412.2
(58) Field of Classification Search ................ 370/338, 370/312, 313, 328; 455/412.2
See application file for complete search history.

(56) References Cited

U.S. PATENT DOCUMENTS

| | | | | |
|---|---|---|---|---|
| 5,983,117 | A | | 11/1999 | Sandler et al. |
| 6,487,196 | B1 | * | 11/2002 | Verthein et al. ............. 370/352 |
| 6,871,070 | B2 | * | 3/2005 | Ejzak ....................... 455/435.1 |
| 7,098,787 | B2 | * | 8/2006 | Miller ..................... 340/539.18 |
| 7,126,939 | B2 | * | 10/2006 | Barany et al. ............... 370/352 |
| 7,127,487 | B1 | * | 10/2006 | Wang et al. ................. 709/204 |
| 7,137,061 | B2 | * | 11/2006 | Blank ......................... 714/816 |
| 7,139,378 | B2 | * | 11/2006 | Kreten et al. .......... 379/201.02 |
| 2002/0128000 | A1 | * | 9/2002 | do Nascimento, Jr. ...... 455/414 |

FOREIGN PATENT DOCUMENTS

| | | |
|---|---|---|
| WO | 00/56092 | 9/2000 |
| WO | WO 00/77992 | 12/2000 |
| WO | WO 01/28256 | 4/2001 |
| WO | WO 01/43389 | 6/2001 |

OTHER PUBLICATIONS

European Search Report dated Jul. 5, 2005 in corresponding European Patent Application No. 02025185.6.
Office action, Dec. 2, 2008, in corresponding European Application No. 02 025 185.6.

* cited by examiner

*Primary Examiner*—Nghi H Ly
(74) *Attorney, Agent, or Firm*—Nixon & Vanderhye P.C.

(57) ABSTRACT

The technology described relates to telecommunication networks and more specifically to a method and an arrangement for signalling in a wireless IP multimedia network and to a wireless IP multimedia network terminal device and permits 3GPP Core Network IP Multimedia Subsystems and all associated products including mobile terminals, Media Gateway, Media Gateway Control Function, etc. to support DTMF tones.

31 Claims, 4 Drawing Sheets

METHOD AND ARRANGEMENT FOR SIGNALLING IN A WIRELESS IP MULTIMEDIA NETWORK AND A WIRELESS IP MULTIMEDIA NETWORK TERMINAL DEVICE

TECHNICAL FIELD

The present invention relates in general to telecommunication networks and more specifically to a method and an arrangement for signalling in a wireless IP multimedia network and to a wireless IP multimedia network terminal device.

BACKGROUND

The background of the invention is discussed briefly in the following. In wireless IP multimedia networks (IP, Internet Protocol), such as the 3GPP Core Network IP Multimedia (3GPP, Third Generation Partnership Project), care must be taken to make efficient use of scarce resources such as the air interface.

As such, most of the codecs used in wireless terminals are narrowband audio and video codecs, such as the AMR-codec (AMR, Adaptive Multi-Rate), which is the default codec in 3G wireless networks (3G, Third Generation). The problem with such a narrowband codecs is that they do not allow DTMF tones to pass through (DTMF, Dual-Tone Multi-Frequency).

DTMF tones are widely used in interactive response systems, e.g. when the user is presented with a menu and has to make a selection. For instance, the user listens to an audio announcement that says "if you need assistance in English language press 1, if you need assistance in Spanish language press 2".

In circuit switched networks, the selection is sent with DTMF tones. However, narrowband codecs, such as the AMR codec, will not be able to transport DTMF tones due to bandwidth constrains.

FIG. 1 illustrates a prior art arrangement for signalling in a wireless IP multimedia network. The presented prior art arrangement for signalling in a wireless IP multimedia network has a terminal A initiating a call to terminal B, marked with reference numbers 1 and 4 respectively.

The terminal A 1 initiating the call has a home network A 2 and while traveling connects to a visiting network A 3. For example, the home network A 2 can be in Stockholm, Sweden and the visiting network A 3 can be in Melbourne, Australia.

The terminal B 4 receiving the call has a home network B 5 and while traveling connects to a visiting network B 6. For example, the home network B 5 can be in Helsinki, Finland and the visiting network B 6 can be in Sydney, Australia.

The terminal A 1 in Melbourne initiates the call towards the terminal B 4 in Sydney. While initiating the call the signalling proceeds from the visiting network A 3 in Melbourne first to the home network A 2 in Stockholm, next to the home network B 5 in Helsinki and then to the visiting network B 6 in Sydney where the terminal B 4 is located.

When the signalling of the call initiation has been completed the speech connection itself can formed directly between the visiting network A 3 in Melbourne where the terminal A 1 is located and the visiting network B 6 in Sydney where the terminal B 4 is located.

Typically, when a multimedia session is established, a PDP context (PDP, Packet Data Protocol) for signalling e.g. SIP signalling is set-up (SIP, Session Initiation Protocol). The PDP context may be seen as a logical channel between the terminal and the GGSN (GGSN, Gateway GPRS Service Node), (GPRS, General Packet Radio System). In addition, a PDP context per media stream is set-up. Each PDP context includes certain quality of service and a certain protection against errors.

Those PDP contexts used for signalling are typically strongly protected against errors. Those PDP contexts used for user plane e.g. audio or video are typically not so strongly protected.

When the DTMF tones are sent in wireless IP multimedia networks there is a problem that the DTMF audio tone does not pass through a narrowband codec such as AMR-codec. Therefore, a solution based on sending a representation of the pressed digit, instead of an audio tone, is preferred.

It should be desirable to re-use an already existing PDP context (e.g., the one used for audio) and multiplex the DTMF digits with the actual audio data. However, when sending DTMF tones in wireless IP multimedia networks, it is a problem that as the PDP context used for audio may (typically will) be suffering weak and unequal error protection, this may cause to errors when a digit is transmitted over that PDP context. Small errors are acceptable for an audio channel, but not when the data is DTMF (e.g., a user press 1 and the media gateway receives 2 due to an error).

Furthermore, when sending DTMF tones in wireless IP multimedia networks, the delays in the signalling path cause additional problems. Another option is to re-use the PDP context allocated for signalling. This PDP context has a strong protection, so no errors are expected. However, this PDP context may be restricted to send and receive data to a particular entity in the network, e.g. a special SIP server known as the Proxy-CSCF (CSCF, Call State Control Function). However, the DTMF data will need to be received in an end-point, such as the Media Gateway. Usually, the IP address of the Media Gateway is not known in advance, and therefore, the PDP context used for signalling cannot be configured to allow transmission of data to a Media Gateway.

Another problem present in sending DTMF tones in wireless IP multimedia networks is that only a small portion of the calls uses DTMF signalling and as most of the calls don't use DTMF signalling they should not be affected. Therefore, setting-up a separate PDP context for all the calls, and for all the duration of the call seems to be not a reasonable solution, as in most cases the PDP context allocated to DTMF tones will not be, in general, used. Resources in the radio network must be efficiently used, and for the minimum duration time.

Furthermore, in wireless IP multimedia networks, the DTMF tones must not be sent over the call control signalling channel, e.g. SIP. The reason for this is that when interworking with the PSTN (PSTN, Public Switched Telephone Network) occurs, the signalling channel e.g. SIP will terminate to a MGC (MGC, Media Gateway Controller), whereas the user plane will terminate to a MG (MG, Media Gateway). Tones are sent and received by the Media Gateway.

Furthermore, in wireless IP multimedia networks, the DTMF tones must not be sent over the call control signalling channel, e.g. SIP. Another reasons for not sending the DTMF tones over the call control signalling channel, e.g. SIP, is that the signalling channel will traverse a set of nodes in the home network. The user plane will follow the shortest path. In case of long-distance roaming, the signalling path will traverse a set of nodes separated by long distance, whereas the user plane may go to a next host. The synchronization between announcements in the audio channel (e.g., "press 1 for assistance in English") and the actual keystrokes is hard to fulfil.

SUMMARY

It is an object of the present invention to overcome or at least mitigate the disadvantages of the prior art. The present invention provides a method and an arrangement for signalling in a wireless IP multimedia network and a wireless IP multimedia network terminal device.

According to a first aspect of the present invention there is provided a method for signalling in a wireless IP multimedia network, said method comprising the steps of triggering a SIP re-INVITE message that is received by the remote endpoint, establishing a new media stream for sending Representations of the DTMF digits in RTP packets between the two endpoints using error protected PDP context, transferring a representation of the DTMF digit corresponding each keystroke pressed by the user over the said error protected PDP context.

Preferably, prior to sending any actual representations of the DTMF digits, the user presses a key in a terminal to instruct the terminal the need to send DTMF tones.

Preferably, after a key in the terminal is pressed a SIP re-INVITE message to be received by the remote endpoint is triggered, said SIP re-INVITE message containing a new session description adding a new audio media stream, said new audio media stream including support for the RTP payload for DTMF digits.

Preferably, an additional, strongly error protected PDP context is established for the added new media stream for sending representations of the DTMF digits in RTP packets between the two endpoints. Alternatively, an existing PDP context is used for the added new media stream for sending representations of the DTMF digits in RTP packets between the two endpoints.

Preferably, when the DTMF interaction is finished, the method also comprises a step of triggering a new SIP re-INVITE message that removes or sets to inactive the additional media stream previously published to be used for the DTMF digits.

More preferably, triggering (18) a new SIP re-INVITE message in response to the user pressing a pre-determined key in a terminal.

Preferably, a mechanism is automatically set up so that when any DTMF key is pressed in the middle of the call, it is interpreted as an initiation of the DTMF service and as a first character of the DTMF service.

Preferably, a terminal initiating or terminating call or session does not know, in advance, if sending or receiving DMTF digits is required or not.

According to a second aspect of the present invention there is provided an arrangement for signalling in a wireless IP multimedia network, said arrangement having means for sending representations of the pressed DMTF digits over the user plane through a separate, strongly protected PDP context. Preferably, the arrangement sets up PDP context on demand to transport digits.

According to a third aspect of the present invention there is provided an arrangement for signalling in a wireless IP multimedia network, the wireless IP multimedia network having a terminal A initiating a call to terminal B through the wireless IP multimedia network, said arrangement having means for triggering a SIP re-INVITE message that is received by the remote endpoint, means for establishing a new media stream for sending representations of the DTMF digits in RTP packets between the two endpoints using error protected PDP context, and means for transferring a representation of the DTMF digit corresponding each keystroke pressed by the user over the said error protected PDP context.

Preferably, the arrangement has means for detecting the user pressing a key in a terminal A prior to sending any actual representations of the DTMF digits said pressing a key instructing the terminal A the need to send DTMF tones. More preferably, after a key in the terminal is pressed a SIP re-INVITE message to be received by the remote endpoint is triggered, said SIP re-INVITE message containing a new session description adding a new audio media stream, said new audio media stream including support for the RTP payload for DTMF digits.

More preferably, an additional, strongly error protected PDP context is established for the added new media stream for sending representations of the DTMF digits in RTP packets between the two endpoints.

Preferably, an existing PDP context is used for the added new media stream for sending representations of the DTMF digits in RTP packets between the two endpoints. Preferably, the arrangement has means to re-generate the DTMF tones from the received RTP data.

Preferably, the arrangement has means for triggering a new SIP re-INVITE message when the DTMF interaction is finished, said new SIP re-INVITE message removing or setting to inactive the additional media stream previously published to be used for the representations of the DTMF digits. More preferably, triggering a new SIP re-INVITE message in response to the user pressing a pre-determined key in a terminal.

Preferably, a mechanism is automatically set up so that when any DTMF key is pressed in the middle of the call, it is interpreted as an initiation of the DTMF service and as a first character of the DTMF service.

Preferably, a terminal initiating or terminating call or session does not know, in advance, if sending or receiving DMTF digits is required or not.

According to a fourth aspect of the present invention there is provided a wireless IP multimedia network terminal device, said terminal device having means for sending a representation of the pressed DMTF digits are sent over the user plane as a separate, strongly protected PDP context. Preferably, the terminal sets up PDP context on demand to transport digits.

According to a fifth aspect of the present invention there is provided a wireless IP multimedia network terminal device, the wireless IP multimedia network having said terminal device A initiating a call to terminal B through the wireless IP multimedia network, said terminal device A having means for triggering a SIP re-INVITE message that is received by the remote endpoint, means for establishing a new media stream for sending representations of the DTMF digits in RTP packets between the two endpoints using error protected PDP context, and means for transferring a representation of the DTMF digit corresponding each keystroke pressed by the user over the said error protected PDP context.

Preferably, the arrangement has means for detecting the user pressing a key in a terminal A prior to sending any actual representations of the DTMF digits said pressing a key instructing the terminal A the need to send DTMF tones.

Preferably, after a key in the terminal is pressed a SIP re-INVITE message to be received by the remote endpoint is triggered, said SIP re-INVITE message containing a new session description adding a new audio media stream, said new audio media stream including support for the RTP payload for DTMF digits.

More preferably, an additional, strongly error protected PDP context is established for the added new media stream for sending representations of the DTMF digits in RTP packets between the two endpoints.

Preferably, an existing PDP context is used for the added new media stream for sending representations of the DTMF digits in RTP packets between the two endpoints.

Preferably, the arrangement has means for triggering a new SIP re-INVITE message when the DTMF interaction is finished, said new SIP re-INVITE message removing or setting to inactive the additional media stream previously published to be used for the representations of the DTMF digits. More preferably, triggering a new SIP re-INVITE message in response to the user pressing a pre-determined key in a terminal.

Preferably, a mechanism is automatically set up so that when any DTMF key is pressed in the middle of the call, it is interpreted as an initiation of the DTMF service and as a first character of the DTMF service.

Preferably, a terminal initiating or terminating call or session does not know, in advance, if sending or receiving DMTF digits is required or not.

According to a sixth aspect of the present invention there is provided a network device installed in a wireless IP multimedia network, said network device having means to receive RTP data and means to re-generate the DTMF tones from the received RTP data.

Figure 1:
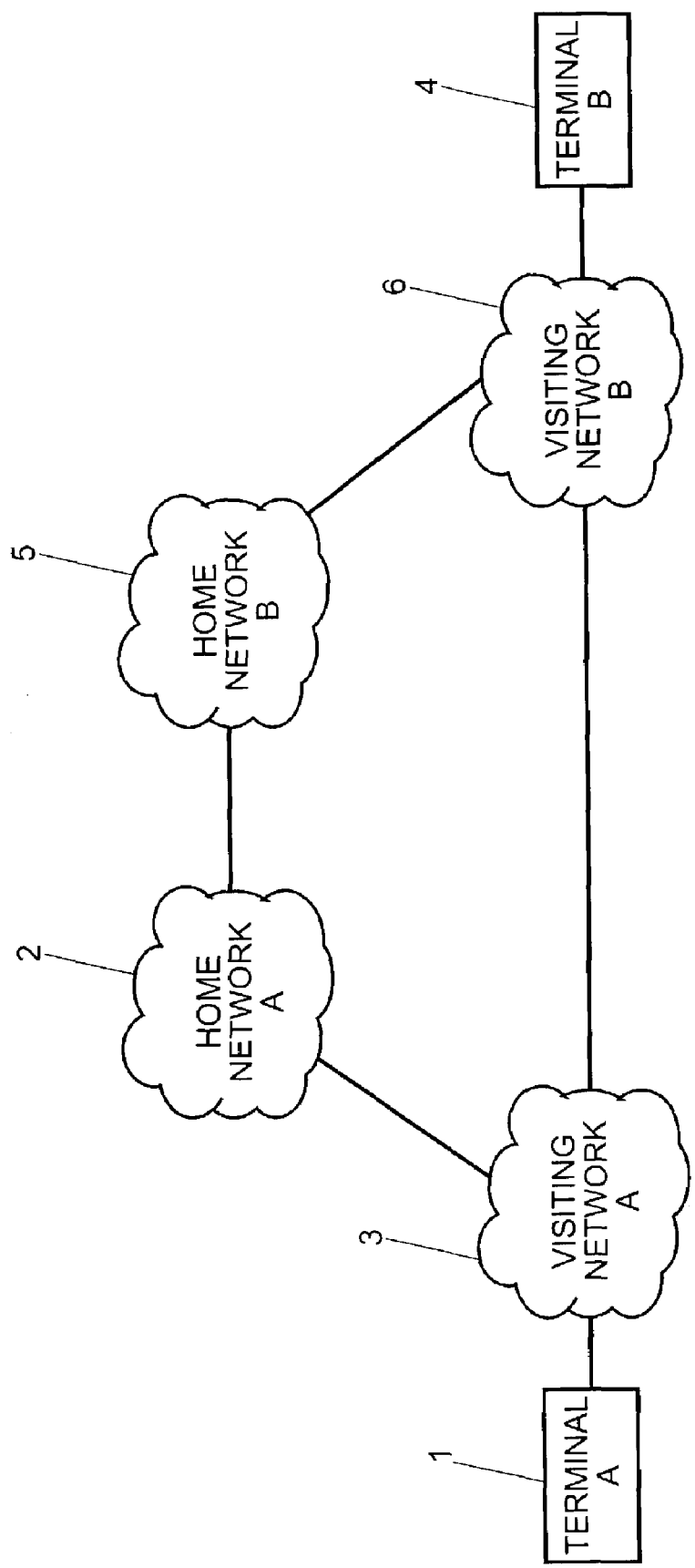
FIG. 1 illustrates a prior art arrangement for signalling in a wireless IP multimedia network.

The FIG. 1 referring to the prior art has been discussed earlier. In the following, reference is made to the FIGS. 2-4.

DETAILED DESCRIPTION

Figure 2:
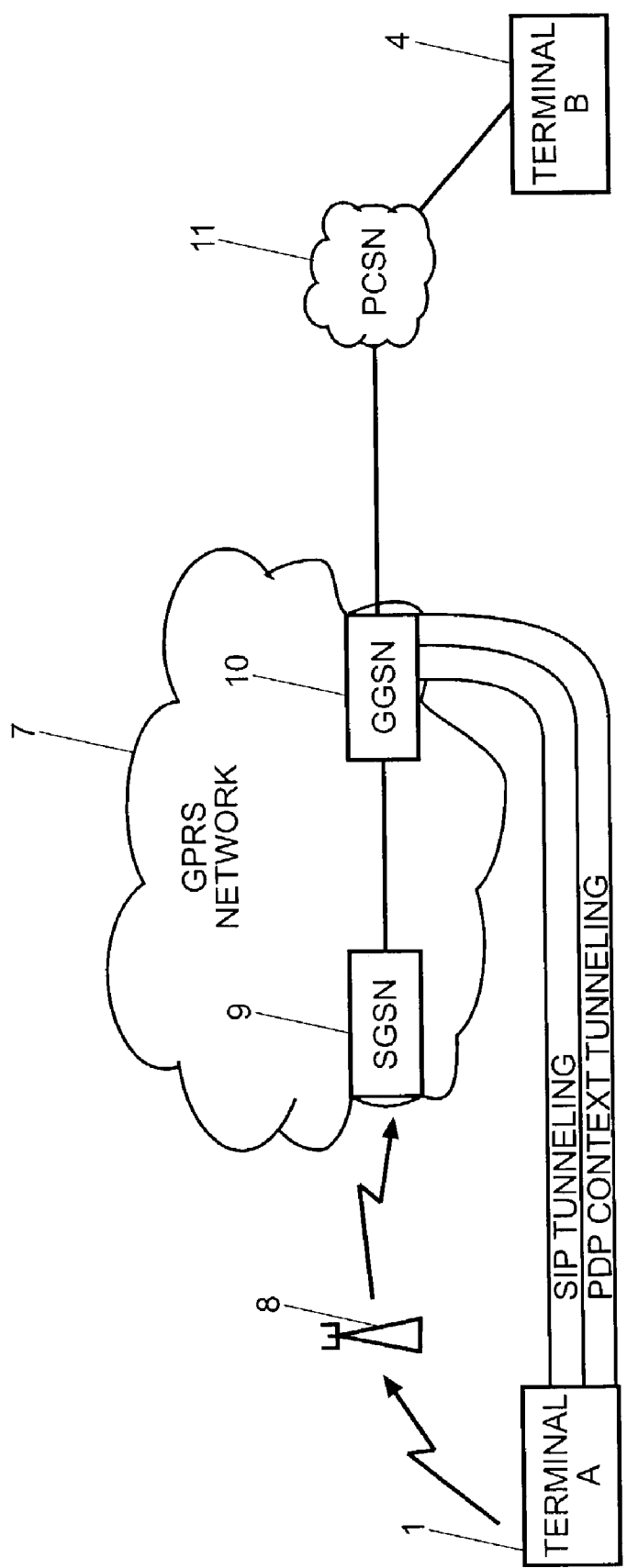
FIG. 2 illustrates an arrangement for signalling in a wireless IP multimedia network according to the present invention.

FIG. 2 illustrates an arrangement for signalling in a wireless IP multimedia network with a terminal A initiating a call to terminal B, marked with reference numbers 1 and 4 respectively.

Terminal A 1 initiates a call towards the GPRS network 7 through a base station 8. In the GPRS Network 7 the call setup request is received by SGSN 9 (SGSN, Gateway Serving GPRS Support Node) and then forwarded to GGSN 10 (GGSN, Gateway GPRS Support Node), (GPRS, General Packet Radio System). A call to terminal B 4 is then setup e.g. via a PCSN 11 (PCSN, Private Circuit Switching Network).

In the arrangement, a representation of the pressed key is sent instead of the actual DTMF tone, and a separate PDP context for sending DTMF tones is set-up.

Representation of the pressed DMTF digits are sent over the user plane as a separate, strongly protected PDP context. This PDP context is set-up on demand to transport those digits, just when there is a need for that.

An alternative for setting up a separate PDP context for DTMF tones can also be the using of an existing PDP context. Typically, PDP contexts are expensive resources in the network, and it is desired to re-use the existing one when possible.

As an option, if the already existing session contains a user plane media stream that is making use of a strongly protected PDP context, and if the PDP context quality of service and other parameters allow re-using this existing strongly protected PDP context, it must be used.

Figure 3:
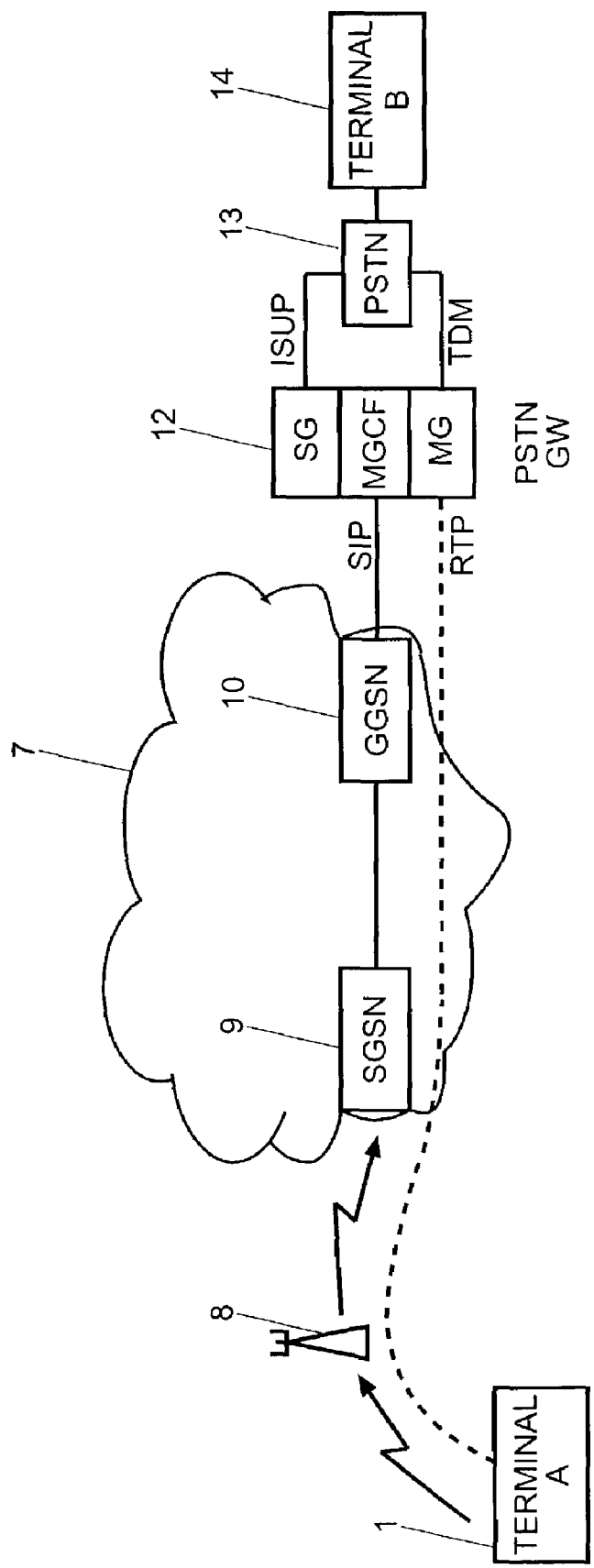
FIG. 3 illustrates an alternative arrangement for signalling in a wireless IP multimedia network according to the present invention.

FIG. 3 illustrates an alternative arrangement for signalling in a wireless IP multimedia network with a terminal 1 A initiating a call to terminal B, here presented as a Computer and marked with reference number 14.

Terminal A 1 initiates a call towards the GPRS network 7 through a base station 8. In the GPRS Network 7 the call setup request is received by SGSN 9 (SGSN, Gateway Serving GPRS Support Node) and then forwarded to GGSN 10 (GGSN, Gateway GPRS Support Node), (GPRS, General Packet Radio System). A call to terminal B 14 is then setup via a PSTN GW 12 (PSTN GW, PSTN Gateway node) through a PSTN 13 (PSTN, Public Switched Telecommunications Network).

The solution according to the present invention presents an alternative arrangement for signalling in a wireless IP multimedia network. In the arrangement according to the present invention a representation of the pressed key is sent over the RTP (RTP, Real Time Protocol).

There exists a standard mechanism for transporting DTMF digits over the RTP. If the call is terminating in the PSTN, the Media Gateway must "re-create" the DTMF tones based on the information received, typically by regenerating the DTMF from the digits received in the RTP data.

The PSTN GW 12 is presented here as divided into three units i.e. SG, MGCF and MG (SG, Signalling Gateway), (MGCF, Media Gateway Control Function), (MG, Media Gateway). The RTP connection is shown here between the terminal A 1 and the PSTN GW MG 12. Respectively ISUP Protocol (ISUP, ISDN User Part), (ISDN, Integrated Services Digital Network) is used between PSTN GW SG 12 and the PSTN 13. Further respectively TDM connection (TDM, Time-Division Multiplex) is used between PSTN GW MG 12 and the PSTN 13.

In this case, the RTP payload for DTMF digits constitutes a signalling channel within the user plane. As such, it must be strongly protected to avoid errors. A user would not like to press a '1' and, due to an error, it is read at the destination end-point as '2'.

Usually, audio and video channels are subjected to weak error protection. In an audio or video stream, if a bit is changed, the end user will not, in general, perceive it. However, the situation is completely different when the representation of a digit is sent. As such, the RTP payload for DTMF digits must be sent over a strongly protected PDP context, such as interactive bearer. Therefore in general, there is a need to set-up a new, strongly error protected, PDP context for transporting DTMF tones within RTP.

When the originating or the terminating end-point publishes the support for RTP payload for DTFM digits as a separate media stream i.e. separate from the audio or video stream, a new PDP context is set-up for each media stream. However most of the calls will not utilize DTMF tones and only a small fraction in the order of 5% or less of the total calls will make use of DTMF tones. Therefore, a new separated PDP context to transport the DTMF tones is established on demand, i.e. only when the use of DTMF tones is required.

The solution to avoid that the PDP context for DTMF digits is set-up for every call, is to send a re-INVITE that publishes the support for the RTP payload for DTMF digits. This SIP re-INVITE message may be triggered by the user, who presses a key in the keypad.

This is similar to what happens in certain PBXs, where the user has to press a key prior to sending DTMF tones to the remote end. As an option, if both end-points know that the DTMF digits are sent by a special method, then they make an exception and publish the support for the RTP payload for DTMF digits, but not establish the separate PDP context until is needed if DMTF is used at all.

Figure 4:
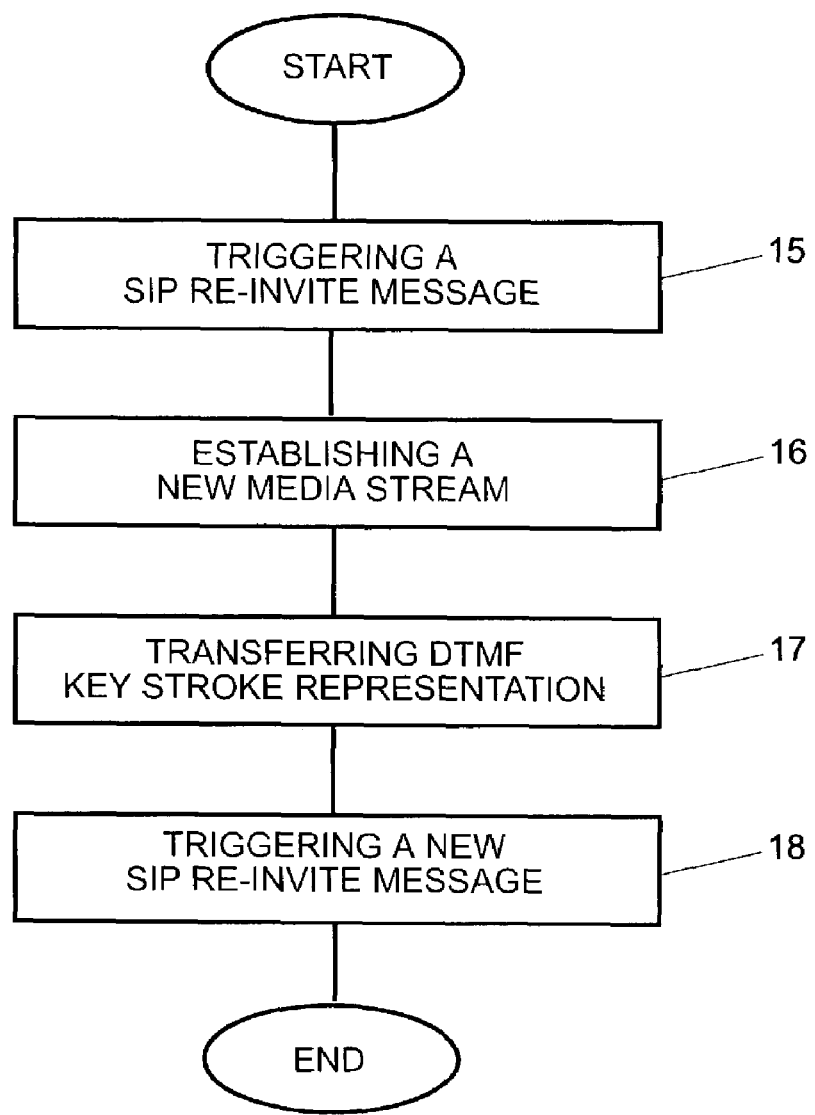
FIG. 4 illustrates a method for signalling in a wireless IP multimedia network according to the present invention.

FIG. 4 illustrates a method for signalling in a wireless IP multimedia network including the steps of triggering a SIP re-INVITE message 15, establishing a new media stream 16, transferring DTMF key stroke representation 17, and triggering a new SIP re-INVITE message 18.

A terminal that initiates or terminates call or session will necessarily not know, in advance, if sending or receiving DMTF digits is required or not. Therefore, it does not publish the support for the RTP payload for DTMF digits in the Session Description Protocol, even if the terminal supports it.

When the user receives the announcement for the DTMF requirement, e.g. an audio menu to press a key to make a selection, then DTMF digits are to be sent.

Therefore prior to sending any actual representations of the DTMF digits, the user presses a key in the terminal to instruct the terminal to need to send DTMF tones. This key may trigger 15 a SIP re-INVITE message that is received by the remote endpoint. This message contains a new session description that adds a new audio media stream. The new media stream includes support for the RTP payload for DTMF digits.

There is also an alternative to have this mechanism automatically set up so that when any DTMF key is pressed in the middle of the call, it is interpreted as an initiation 15 of the DTMF service and as a first character of the DTMF service.

The SIP re-INVITE message establishes 16 a new media stream for sending representations of the DTMF digits in RTP packets between the two endpoints. This media stream typically requires the establishment of an additional, strongly error protected, PDP context. In exceptional cases, if the already ongoing session already comprises a strongly error protected PDP context that is being used for any of the media streams but not for SIP signalling, such an existing PDP context may be used, and there is not a need to establish a new one.

After the media stream is established, the user can press one or more keystrokes and the representation of the digit is transferred 17 over a strong protected PDP context.

Optionally, when the DTMF interaction is finished, the user may press a pre-determined key that will trigger 18 a new SIP re-INVITE message that will remove or set to inactive the additional media stream previously published to be used for the DTMF digits. This will dismiss the PDP context for DTMF digits and release all the associated resources in the terminal and the network, while still keeping alive other PDP contexts used for audio, video or call control signalling.

The above-described technology provides the following benefits. 3GPP Core Network IP Multimedia Subsystem and associated products including mobile terminals, Media Gateway, Media Gateway Control Function, etc. can support DTMF tones. This is very useful in order to provide interaction with legacy systems in the PSTN, such as airline reservation systems, customer services, etc.

Some operators have already stated the requirement to support DTMF tones in the 3GPP Core Network IP Multimedia Subsystem. The presented solution works and makes efficient use of the network resources.

The invention claimed is:

1. A method for signaling in a wireless internet protocol (IP) multimedia network, wherein the method comprises:
    establishing a session with at least a first media stream in the wireless IP multimedia network between two endpoints,
    triggering a session initiation protocol (SIP) re-INVITE message that is received by a remote one of the endpoints,
    establishing a new additional media stream associated with the session for sending representations of the dual tone multi-frequency (DTMF) digits in real-time transport protocol (RTP) packets between the two endpoints using an error-protected packet data protocol (PDP) context, and
    transferring a representation of the DTMF digit corresponding each keystroke pressed by a user over the said error protected PDP context.

2. A method according to claim 1, wherein a mechanism is automatically set up so that when any DTMF key is pressed in the middle of the session, it is interpreted as an initiation of the DTMF service and as a first character of the DTMF service.

3. A method according to claim 1, wherein a terminal initiating or terminating the session does not know, in advance, if sending or receiving DMTF digits is required or not.

4. A method according to claim 1, wherein when the DTMF interaction is finished, the method also comprises:
    triggering a new SIP re-INVITE message that removes or sets to inactive the additional media stream used for the DTMF digits.

5. A method according to claim 4, wherein a new SIP re-INVITE message is triggered in response to the user pressing a pre-determined key in a terminal.

6. A method according to claim 1, wherein prior to sending any actual representations of the DTMF digits, the user presses a key in a terminal associated with one of the endpoints to instruct the terminal of the need to send DTMF tones.

7. A method according to claim 6, wherein a terminal initiating or terminating the session does not know, in advance, if sending or receiving DMTF digits is required or not.

8. A method according to claim 6, wherein after a key in the terminal is pressed, a SIP re-INVITE message to be received by the remote endpoint is triggered, said SIP re-INVITE message containing a new session description adding a new audio media stream, said new audio media stream including support for an RTP payload for DTMF digit representations.

9. A method according to claim 8, wherein an additional, strongly error protected PDP context is established for the added new media stream for sending representations of the DTMF digits in RTP packets between the two endpoints.

10. A method according to claim 3, wherein an existing PDP context is used for the added new media stream for sending representations of the DTMF digits in RTP packets between the two endpoints.

11. An arrangement for signaling in a wireless internet protocol (IP) multimedia network, the wireless IP multimedia network having a terminal A initiating a session with a terminal B with at least a first media stream through the wireless IP multimedia network,
    wherein in the arrangement includes electronic circuitry configured to:

trigger a session initiation protocol (SIP) re-INVITE message that is received by the terminal B, establish a new additional media stream for sending representations of the dual tone multi-frequency (DTMF) digits in real-time transport protocol (RTP) packets between the terminals A and B using an error-protected packet data protocol (PDP) context, and transfer a representation of the DTMF digit corresponding each keystroke pressed by the user over the error-protected PDP context.

12. An arrangement according to claim 11, wherein the electronic circuitry is further configured so that when any DTMF key is pressed in the middle of the session, it is interpreted as an initiation of the DTMF service and as a first character of the DTMF service.

13. An arrangement according to claim 11, wherein a terminal initiating or terminating the session does not know, in advance, if sending or receiving DMTF digits is required or not.

14. An arrangement according to claim 11, wherein the electronic circuitry is further configured to trigger a new SIP re-INVITE message when the DTMF interaction is finished, said new SIP re-INVITE message removing or setting to inactive the additional media stream used for the representations of the DTMF digits.

15. An arrangement according to claim 14, wherein the electronic circuitry is further configured to trigger a new SIP re-INVITE message in response to a user pressing a predetermined key in one of the terminals A and B.

16. An arrangement according to claim 11, wherein the electronic circuitry is further configured to detect a user pressing a key on one of the terminals A and B prior to sending any actual representations of the DTMF digits, said pressing a key instructing the one terminal of the need to send DTMF tones.

17. An arrangement according to claim 16, wherein a terminal initiating or terminating the session does not know, in advance, if sending or receiving DMTF digits is required or not.

18. An arrangement according to claim 16, wherein after a key in the one terminal is pressed, the electronic circuitry is further configured to trigger a SIP re-INVITE message to be received by the other terminal, said SIP re-INVITE message containing a new session description adding a new audio media stream, said new audio media stream including support for the RTP payload for DTMF digits.

19. An arrangement according to claim 18, wherein the electronic circuitry is further configured to establish an additional, strongly error-protected PDP context for the added new media stream for sending representations of the DTMF digits in RTP packets between the terminals A and B.

20. An arrangement according to claim 18, wherein the electronic circuitry is further configured to use an existing PDP context for the added new media stream for sending representations of the DTMF digits in RTP packets between the terminals A and B.

21. An arrangement according to claim 18, wherein the electronic circuitry is further configured to re-generate the DTMF tones from the received RTP data.

22. A wireless internet protocol (IP) multimedia network terminal device comprising:

means for initiating a multimedia session with at least a first media stream between the terminal and a remote endpoint through a wireless IP multimedia network, means for triggering a session initiation protocol (SIP) re-INVITE message that is received by the remote endpoint, means for establishing a new additional media stream for the multimedia session for sending representations of the dual tone multi-frequency (DTMF) digits in real-time transport protocol (RTP) packets between the terminal and the endpoint using an error-protected packet data protocol (PDP) context, and means for transferring a representation of the DTMF digit corresponding to each keystroke pressed on terminal by a user of the terminal over the said error protected PDP context.

23. A terminal device according to claim 22, further comprising means for interpreting when any DTMF key is pressed in the middle of the call as an initiation of the DTMF service and as a first character of the DTMF service.

24. A terminal device according to claim 22, wherein the terminal does not know, in advance of initiating or terminating the session, if sending or receiving DMTF digits is required or not.

25. A terminal device according to claim 22, wherein the arrangement has means for triggering a new SIP re-INVITE message when the DTMF 26. A terminal device according to claim 25, wherein the means for triggering is configured to trigger a new SIP re-INVITE message in response to the user pressing a predetermined key in a terminal.

27. A terminal device according to claim 22, wherein the arrangement has means for detecting the user pressing a key in the terminal prior to sending any actual representations of the DTMF digits said pressing a key instructing the terminal of the need to send DTMF tones.

28. A terminal device according to claim 27, wherein the terminal does not know, in advance of initiating or terminating the session, if sending or receiving DMTF digits is required or not.

29. A terminal device according to claim 27, wherein after a key in the terminal is pressed, the means for triggering is arranged to trigger a SIP re-INVITE message to be received by the remote endpoint, said SIP re-INVITE message containing a new session description adding a new audio media stream, said new audio media stream including support for the RTP payload for DTMF digits.

30. A terminal device according to claim 29, wherein the means for establishing is configured to establish an additional, strongly error protected PDP context for the added new media stream for sending representations of the DTMF digits in RTP packets between the two endpoints.

31. A terminal device according to claim 29, wherein the means for establishing is configured to use an existing PDP context for the added new media stream for sending representations of the DTMF digits in RTP packets between the two endpoints.

* * * * *

UNITED STATES PATENT AND TRADEMARK OFFICE
CERTIFICATE OF CORRECTION

PATENT NO. : 7,529,213 B2
APPLICATION NO. : 10/291762
DATED : May 5, 2009
INVENTOR(S) : Garcia-Martin It is certified that error appears in the above-identified patent and that said Letters Patent is hereby corrected as shown below:

In Column 3, Line 52, delete "DMTF" and insert -- DTMF --, therefor at each occurrence throughout the whole patent.

In Column 10, Line 29, in Claim 25, after "DTMF" insert -- interaction is finished, said new SIP re-INVITE message removing or setting to inactive the additional media stream used for the representations of the DTMF digits. --.

Signed and Sealed this

Tenth Day of November, 2009

David J. Kappos
*Director of the United States Patent and Trademark Office*